United States Patent

Hanif et al.

[11] Patent Number: 5,889,962
[45] Date of Patent: *Mar. 30, 1999

[54] METHOD AND SYSTEM FOR PROVIDING AN ADDITIONAL IDENTIFIER FOR SESSIONS IN A FILE SERVER

[75] Inventors: Mohammad Hanif, Fremont; Kevin Stinson, San Jose; Kazuhisa Yanagihara, Santa Cruz, all of Calif.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 542,944

[22] Filed: Oct. 13, 1995

[51] Int. Cl.⁶ .............................. G06F 13/38; G06F 15/17
[52] U.S. Cl. ................................. 395/200.58; 395/200.75; 395/200.58
[58] Field of Search .................... 395/200.12, 200.09, 395/200.03, 200.04, 200.31, 200.34, 200.47, 200.57, 200.58, 200.75

[56] References Cited

U.S. PATENT DOCUMENTS

| | | | |
|---|---|---|---|
| 4,661,902 | 4/1987 | Hochsprung et al. | 364/200 |
| 4,689,786 | 8/1987 | Sidhu et al. | 370/94 |
| 5,150,464 | 9/1992 | Sidhu et al. | 395/200 |
| 5,165,020 | 11/1992 | Sudama et al. | 395/200 |
| 5,475,819 | 12/1995 | Miller et al. | 395/200.03 |
| 5,485,460 | 1/1996 | Schrier et al. | 395/200.57 |
| 5,504,866 | 4/1996 | Hirasawa | 395/200.75 |
| 5,553,242 | 9/1996 | Russell et al. | 395/200.12 |
| 5,594,872 | 1/1997 | Kawano et al. | 395/200.75 |
| 5,615,339 | 3/1997 | Ban | 395/200.12 |
| 5,636,371 | 6/1997 | Yu | 395/200.57 |

OTHER PUBLICATIONS

Martin Hall et al., "Windows Sockets, Version 1.1", Jan. 20, 1993.

*Primary Examiner*—Mark H. Rinehart
*Attorney, Agent, or Firm*—Sawyer & Associates

[57] ABSTRACT

A system and method for increasing the number of entities that can be serviced by a file server. The file server includes a plurality of server session sockets (SSSs), and means for assigning an entity identification number and one of the plurality of SSSs to a request from one of the number of entities, wherein each SSS can support a plurality of entities.

19 Claims, 7 Drawing Sheets

METHOD AND SYSTEM FOR PROVIDING AN ADDITIONAL IDENTIFIER FOR SESSIONS IN A FILE SERVER

CROSS-REFERENCE TO RELATED APPLICATIONS

The present application is related to applications Ser. No. 08/542,834, entitled "A METHOD AND SYSTEM FOR ASSIGNING THREADS TO ACTIVE SESSIONS" and Ser. No. 08/542,836, entitled "A METHOD AND SYSTEM FOR MAXIMIZING THE USE OF THREADS IN A FILE SERVER FOR PROCESSING NETWORK REQUESTS," filed on the same date as the present application and assigned to the assignee of the present application.

FIELD OF THE INVENTION

The present invention relates generally to an apparatus and method for transferring data between a file server and a plurality of receiving data processing devices. More particularly, this invention relates to assigning a unique address for each data processing and peripheral device in a local area network in order to transfer data between each of those devices.

BACKGROUND OF THE INVENTION

In the computing industry, it is quite common to transfer data and commands between a plurality of data processing devices, such as computers, printers, displays, terminals, and other network resources. Interconnection of computers and other peripheral devices principally developed in the early 1970's with the advent of computer networking systems which permitted the distribution of access to computing resources beyond the immediate proximity of a mainframe computer.

Recently, "local area networks" (LANs) have been developed which allow transfer of data between a localized set of computing and peripheral devices, typically in the same geographical area such as one building or a plurality of buildings closely situated together. Examples of such LANs may be found in U.S. Pat. Nos. 4,063,220, 4,661,902, and 4,689,786.

In the APPLETALK (R) (a trademark of Apple Computer, Inc.) network system, each "node" or computer, printer, peripheral, and other network resources share resources with a file server. The file server includes three main APPLE-TALK protocols called the APPLETALK Filing Protocol (AFP), APPLETALK Session Protocol (ASP), and the operating system of the file server includes the APPLETALK Transaction Protocol (ATP). The AFP is a protocol dealing with issues that are file system related. The AFP uses the ASP to receive file system requests from network entities and to send responses back to the entities. The request and responses may be partitioned into smaller data packets and the ASP uses the ATP to send and receive these data packets over the network.

The ASP is a protocol for maintaining network sessions between the file server and the network entities. A session is opened once an entity establishes communication with the server. The ASP keeps information about the entity in a session object In the APPLETALK network system, each entity is assigned a unique 8-bit identifier which allowed the entity to filter out transmissions directed to other entities. Since the 8 bit identifier, or entity ID, was 8 bits in length, the number of entities or computers and peripherals and other network resources in the LAN was limited to 256 (this number is less the values where all the bits are set and all of the bits are clear, which are reserved). This limits the utility of such LANs, since an expansion beyond the 256 node limit required the connection of additional hardware to the system, such as another file server, for example. This results in an increase of the complexity of the local area network, as well as an increase in its cost.

U.S. Pat. No. 5,150,464, entitled "Local Area Network Device Start Up Process" and U.S. Pat. No. 5,150,464, entitled "Network Device Location" are both directed to systems for extending the number of entities a network can support. Even though these systems operate effectively for their intended purpose, they are both directed to extending the use of a network by adding routers and allowing the network to be connected to other network systems. What is needed therefore is a system and method in which more users can be served at one time by one file server on such a network. The system must be easily implemented in an existing network system. In addition, the system should easily support use by the networks. The present invention addresses such a need.

SUMMARY OF THE INVENTION

The present invention provides a system and method for increasing the number of entities that can be serviced by a file server. The file server includes a of server session sockets (SSSs), and means for assigning an entity identification number and one of the plurality of SSSs to a request from one of the number of entities.

According to the system and method disclosed herein, the file server increases the number of network entities in a manner that supports existing networks.

DESCRIPTION OF THE INVENTION

The present invention relates to an improvement in a server utilized in a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
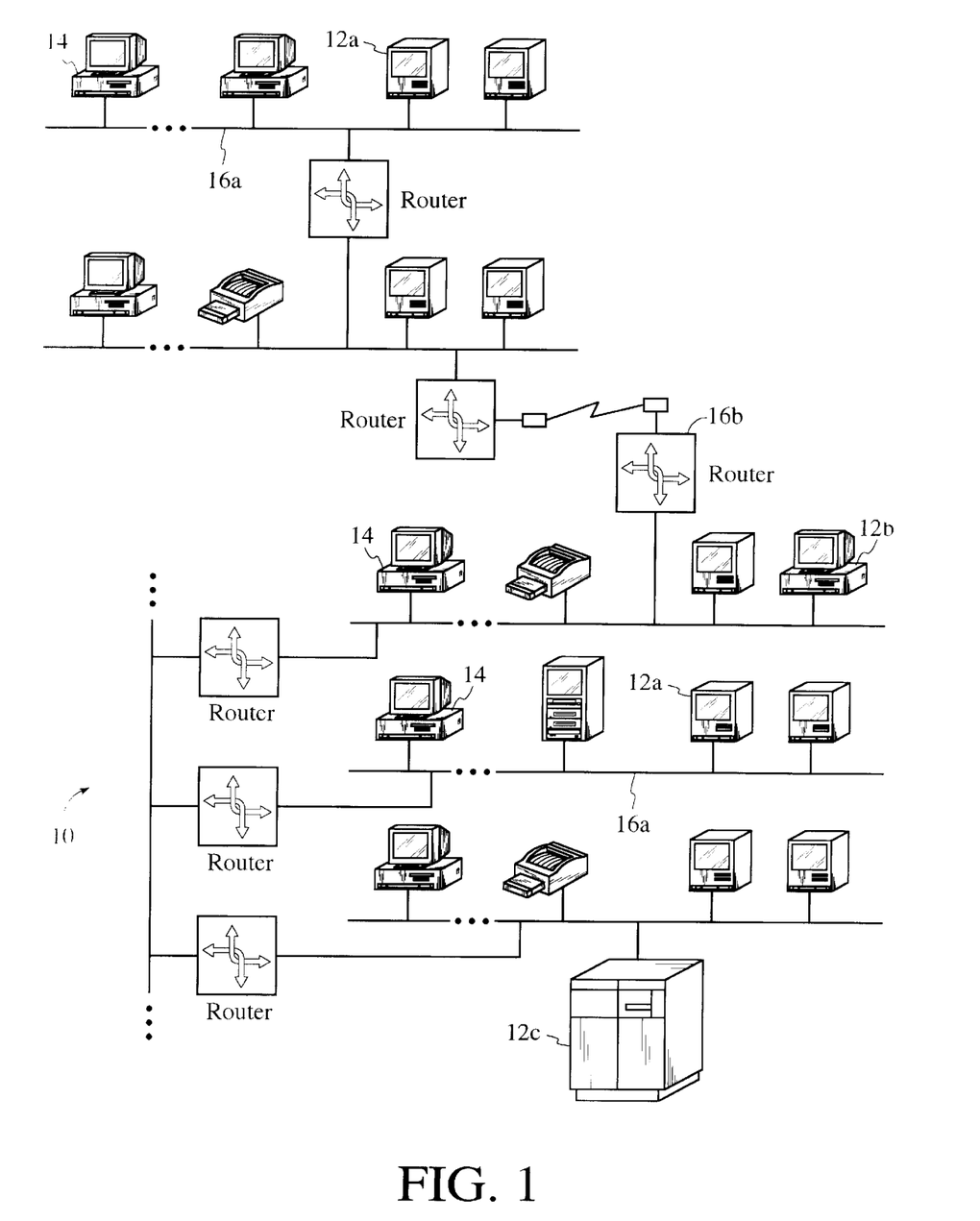
FIG. 1 is a block diagram illustrating a computer network system.

FIG. 1 is a block diagram illustrating a computer network environment in which the present invention resides. The network 10 may include a plurality of computers, such as personal computers 12a, minicomputers 12b, and mainframes 12c, and server devices 14, such as a file and printer servers. For the purposes of this specification, all data processing and peripheral devices which are coupled to the network are collectively referred to as entities 12. The entities 12 may be connected through a variety of network connection devices 16 such as cables 16a and routers 16b, for example. The purpose of the network 10 is to eliminate access barriers resulting from physical separation between the various entities 12 and to share the resources the entities 12 contain.

Figure 2:
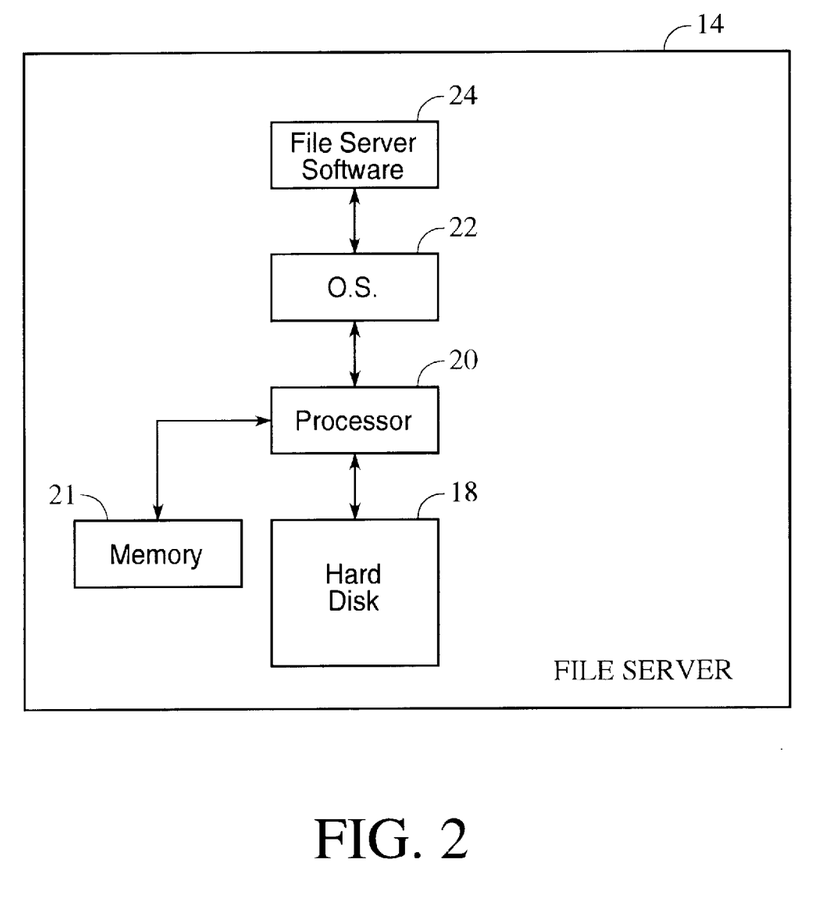
FIG. 2 is a block diagram of a server 14 in which the present invention is implemented.

FIG. 2 is a block diagram of a server 14 in which the present invention is implemented. The server includes one or more hard disk drives 18, a processor 20, memory 21, an operating system 22, and file server software 24. The file server software 24 enables a computer to become a file server 14 for one or more entities 12, on the network.

In a preferred embodiment, the file server software 24 is Appleshare File Server software, which utilizes a protocol architecture called APPLETALK. Both Appleshare and APPLETALK were designed and developed by Apple Computer, Cupertino, Calif. Also in a preferred embodiment, the processor 20 is a PowerPC manufactured by Motorola and, the operating system 22 is a Macintosh Operating System, such as System 7.5, for example.

Figure 3:
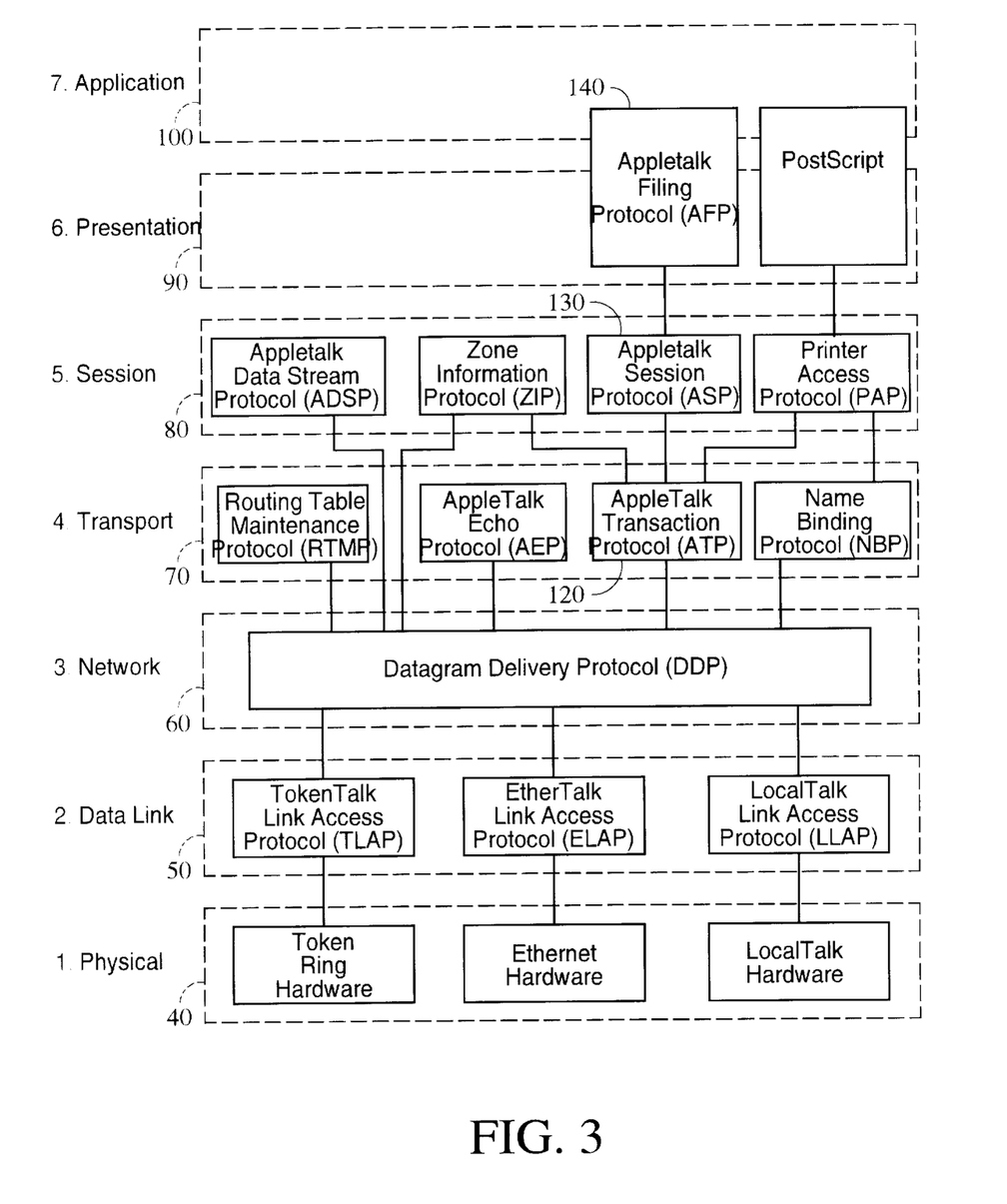
FIG. 3 is a diagram illustrating the APPLETALK protocol architecture within the framework of the Open Systems Interconnection (OSI) reference model.

Referring to FIG. 3, the APPLETALK protocol architecture is shown within the framework of the Open Systems Interconnection (OSI) reference model developed by the International Standards Organization (ISO). The OSI model defines the concepts of a protocol and a service interface that includes seven layers: Physical 40, Data Link 50, Network 60, Transport 70, Session 80, Presentation 90, and Application 100. The layers allow data packets to be transmitted from a variety of hardware to another, and from one process (socket) to another. Each layer functions as a separate process or filter that either appends protocol information onto existing data packets transmitted in the network 10, or routes appropriate data packets through the network 10 depending on the type of packet and the particular layer in which the packet resides.

Referring to both FIGS. 1 and 3, the higher-level network services in both OSI and APPLETALK are built using the model of a entity 12 issuing a sequence of commands to a server 14. The server 14 carries out the commands and then reports the results to the entity 12. The present invention relates to the interaction between the following higher-level APPLETALK protocols: the APPLETALK Transaction Protocol (ATP) 120, the APPLETALK Session Protocol (ASP) 130, and the APPLETALK Filing Protocol (AFP) 140. The APPLETALK protocol is described in further detail in Inside APPLETALK (R), by Gursharan Sidhu, Richard F. Andrews, and Alan B. Oppenheimer (2d Ed. 1990), published by Addision-Wesley.

The purpose of the AFP 140 is to allow the server to share files with the entities 12 on the network 10 through network commands. The ASP 130 serves the AFP 140 and is used to establish a connection, called a session, between an entity 12 and the server 14. A command from an entity 12 to a server 14 may require several data packets to be sent across the network 10. The ATP 120 provides the ASP 130 with a transaction service for sending and receiving packets across the network 10.

Typically, packets are sent and received between an entity 12 and the server 14, but packets may also be sent and received between software processes. Each entity 12 in the network 10 may include one or more software processes. One software process can request that another software process perform a higher-level function and then report the outcome. A software process that makes use of the services of another software process is called a client. This interaction between a requesting client and a responding client is called a transaction, and is handled by the ATP 120. For purposes of this discussion, when an entity 12 on the network initiates a transaction with the file server 14, the entity 12 is the requesting client and the file server 14 the responding client.

Figure 4:
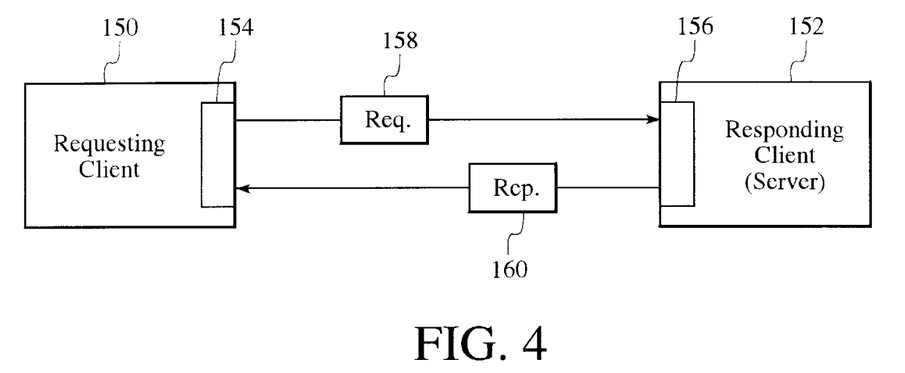
FIG. 4 is a block diagram illustrating the basic structure of a transaction between a requesting client and a responding server.

FIG. 4 is a block diagram illustrating the basic structure of a transaction between a requesting client 150 and a responding server 152. In order to send and receive transactions, a client must first create an addressable entity on the network called a socket. This is accomplished by both the requesting client 150 and the responding server 152 making a call to the ATP 120 to open a respective socket 154 and 156. The socket opened at the responding entity is called a transaction listening socket. Both the requesting client 150 and the responding server 152 can have multiple sockets for receiving/transmitting transactions, where each socket is identified by a unique 8-bit socket number.

The requesting client 152 initiates a transaction by issuing a call to the ATP 120 and supplying the parameters of the request. Once the transaction request packet 158 is received by the socket 156 of the responding server 152, the transaction request is serviced and the responding server 152 returns a transaction response packet 160 reporting the transaction outcome.

Before an entity 12 can send transaction requests to a server 14, a session must be established between them. Whereas the ATP 120 handles individual transactions, the ASP 130 establishes and maintains sessions between each entity 12 and the server 14. For the duration of the session, the entity 12 can send a sequence of commands to the server 14. The ASP 130 ensures that the commands are delivered without duplication in the same order as they were sent, and sends the results of the commands back to the entity 12. In order to open and then maintain sessions, the ASP 130 utilizes two different types of sockets for receiving two different types of requests.

Figure 5:
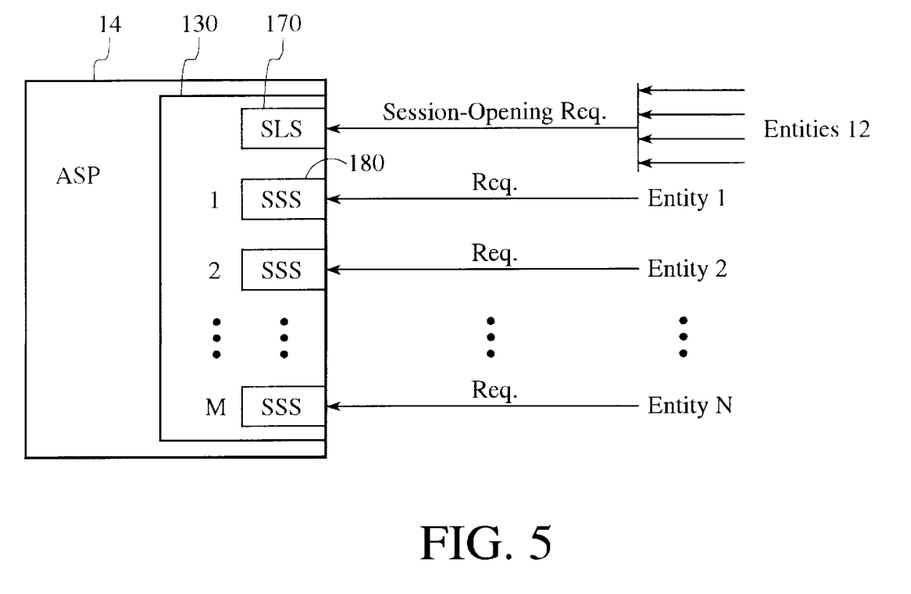
FIG. 5 is a block diagram illustrating the two different types of sockets utilized by the ASP.

FIG. 5 is a block diagram illustrating the two different types of sockets utilized by the ASP 130. In order to make itself known on the network 10 to other entities, the ASP 130 calls the ATP 120 (FIG. 3) to open an ATP responding socket, known as the session listening socket (SLS) 170. The SLS is used to listen for session-opening requests from the entities 12 on the network 10.

Once a session is established between an entity 12 and the server 14, a server session socket (SSS) 180 is used to listen for network requests from a particular entity 12 in all further communication during that session. Thus, for every open session between an entity 12 and the server 14, there is a corresponding network addressable SSS in which the entity 12 sends all future requests. Once an entity 12 sends a session-opening request to the server 14 and a session is established, a session object is created in the server 14 in which all information about the entity 12 is kept.

In APPLETALK network systems, the ASP 130 previously assigned only the entity an unique 8-bit identifier. Since the 8-bit identifier, called a session ID, is 8 bits in length, the number of entities or computers and peripherals and other network resources in the LAN was limited to 256 (this number is less the values where all the bits are set and all of the bits are clear, which are reserved).

According to the present invention, the number of entities that can be connected to the server 14 is increased by assigning an entity to a particular SSS 180 and by associating the entity's ID number with the ID of the particular SSS 180.

When the server 14 is first initialized, the ASP 130 open N SSS's 180. A session is then established between an entity 12 and the server 14 when the entity 12 sends a transaction request packet known as an OpenSess (open session) packet to the SLS 170.

Figure 6:
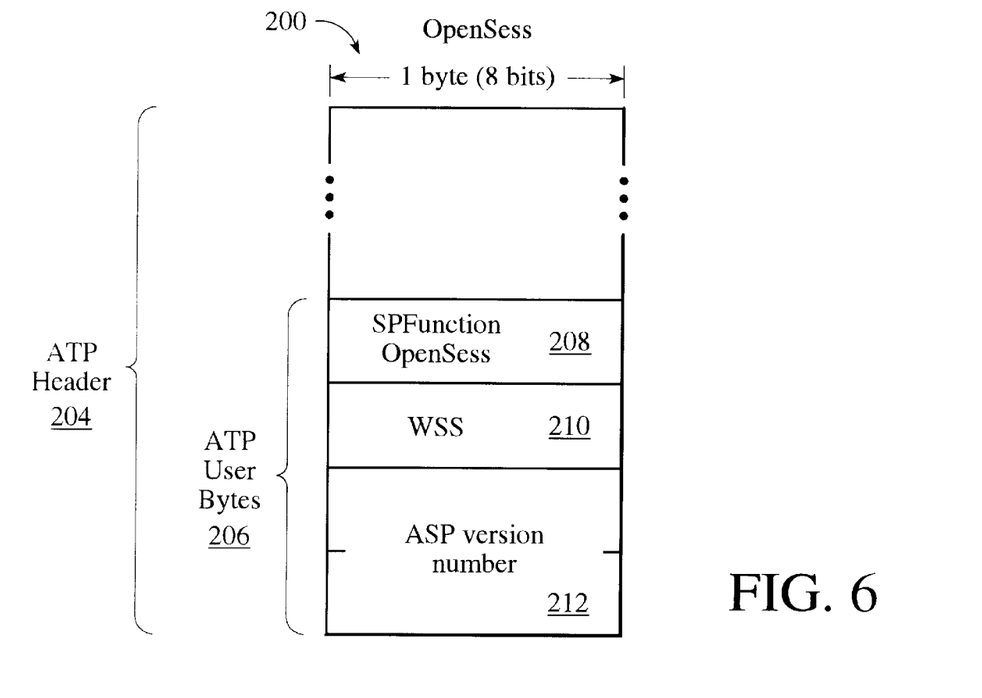
FIG. 6 is a block diagram of the OpenSess packet.

FIG. 6 is a block diagram of the OpenSess packet 200. The OpenSess packet 200 includes an ATP header 204 and ATP user bytes 206. The ATP user bytes 206 in an OpenSess packet 200 include an 1-byte SPFunction field 208 identifying the packet as an open session packet; an 1-byte WSS field 210 containing the socket number of the entity 12; and an 2-byte ASP version number field.

When the ASP 130 in the server 14 receives an OpenSess packet 200 from an entity 12, the ASP 130 generates an 8-bit session ID, which is unique per SSS, for the entity 12. The ASP 130 also saves the WSS, the session ID, and other data in the session object created for the entity 12. The ASP 130 then returns a transaction request packet known as an OpenSessReply packet to the entity 12.

Figure 7:
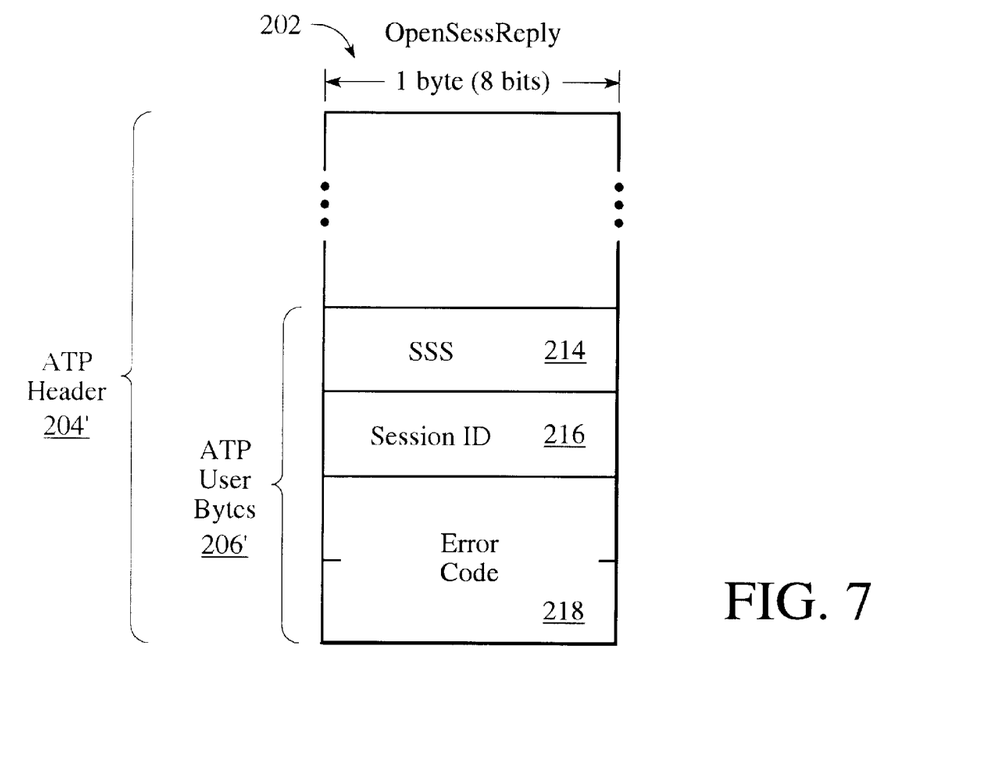
FIG. 7 is a block diagram of the OpenSessReply packet.

FIG. 7 is a block diagram of the OpenSessReply packet. The packet 200 also includes an ATP header 204' and ATP user bytes 206'. The ATP user bytes 206' in an OpenSessReply packet 202 include the SSS field 214 containing the session reference number; an 8-bit session ID 216 for the entity 12; and an 2-byte error code 218.

According to the present invention, the actual assignment of a particular SSS 180 to an ASP session occurs when SLS receives an OpenSess packet 200 from an entity. In a preferred embodiment, each SSS includes a table for storing session objects for each session the SSS maintains. Once an ASP session is assigned to a particular SSS, the session object for the session is stored in the table for the SSS. Since each SSS can maintain 256 sessions, each table contains 256 entries.

Figure 8:
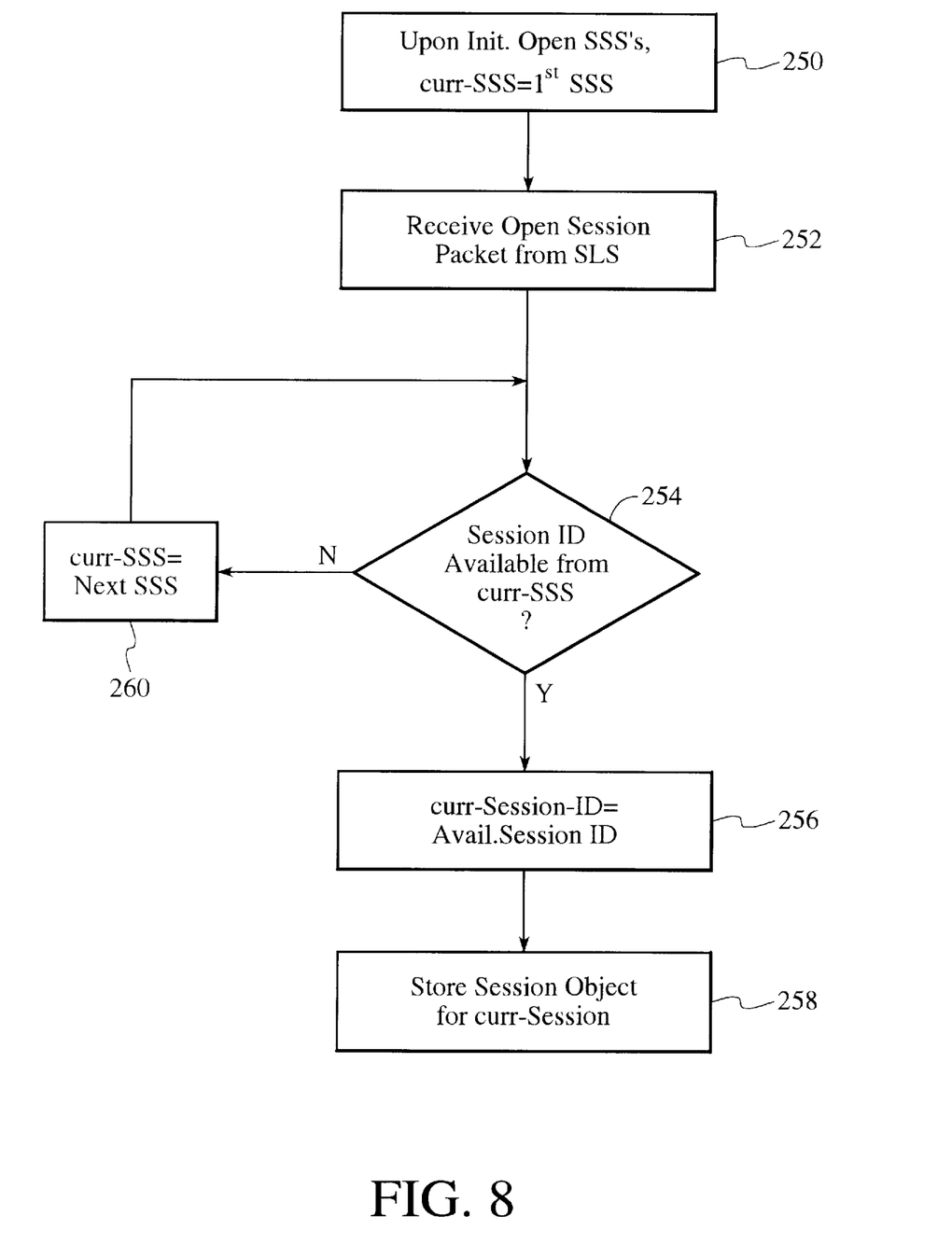
FIG. 8 is a flow chart depicting the steps taken by the ASP when assigning a session ID and an SSS to an incoming open session request in accordance with the present invention.

FIG. 8 is a flow chart depicting the steps taken by the ASP 130 when assigning a session ID and an SSS to an incoming open session request in accordance with the present invention. Upon server initialization, the N SSS's are opened and a variable called current-SSS is set equal to the first SSS among all allocated SSS's in step 250. When an OpenSess packet arrives at the SLS, the packet is received in step 252. Next, a session ID must be set for the entity. This is done by examining the current-SSS to determine if the SSS has any unused session ID's (0–255) in step 254. If not, then the next SSS must be examined by setting current-SSS equal to the next SSS in step 256. Once an SSS is found that has an available session ID, the new session ID is assigned the value of the available session ID in step 258, and the current-SSS is made equal to the newly found SSS. The session object for the new session is then stored in the table for the current-SSS in step 260. Both the session ID and the entities address on the network are stored in the session object.

After a session is established, the entity 12 may send a session maintenance packet known as an SPtickle packet to the SLS 170 that includes a session ID, but not the SSS reference number. Therefore, the ASP 130 must determine which SSS the entity was assigned to when a session was established between the entity 12 and the server 14.

Figure 9:
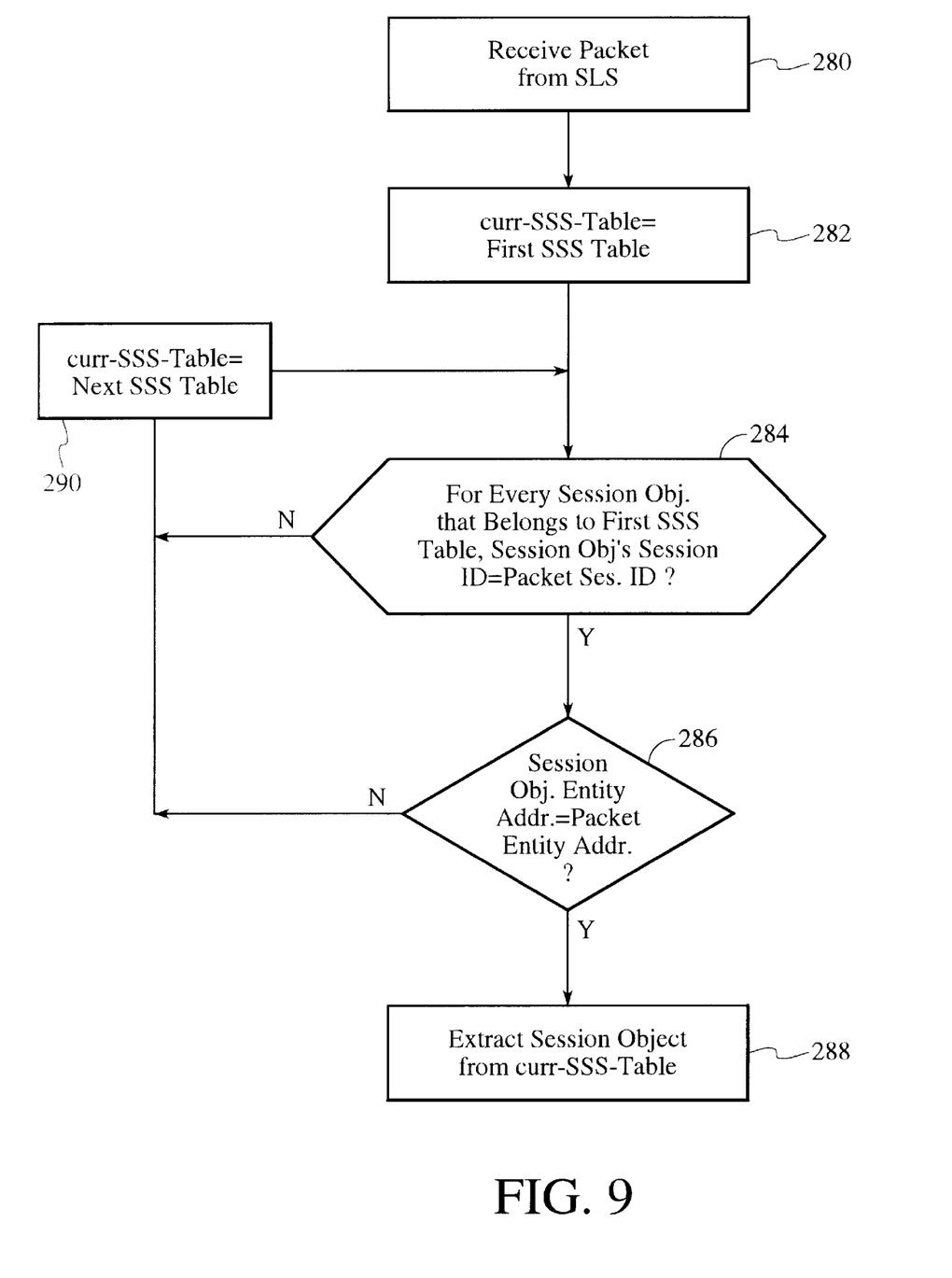
FIG. 9 is a flow chart depicting the steps taken by the ASP to determine which SSS an entity belongs to when a packet arrives that does not include an SSS reference number.

FIG. 9 is a flow chart depicting the steps taken by the ASP to determine which SSS an entity belongs to when a packet arrives that does not include an SSS reference number. The ASP first receives the SPTickle packet at the SLS and extracts the entity's address and the session ID from the packet in step 280. Next, the ASP 130 must search through the SSS tables to find the corresponding ASP Session. This is done by first setting the current-SSS-table to the first SSS-table in step 282. Every session object stored in the current-SSS-table is then examined to determine whether the session ID contained in the session object matches the session ID from the packet in step 284. If the two session D's match, then the entity addresses are compared in step 286. If the entity addresses match, then the packet was meant for this session object, and the session object is extracted from the current-SSS-table for further processing in step 288. If either the session ID's or the entity addresses do not match, then the current-SSS-table is set to the next SSS-table in step 290 and the process repeats until a match is found.

A method and system for increasing the number of entities 12 serviced by a file server 14 by associating individual session IDs to particular SSS's in the file server has been disclosed. One with ordinary skill in the art will recognize that the present invention is not limited to the APPLETALK protocol or the Macintosh file system, but rather can be implemented with any type of network protocol and any type of file system. Software written according to the present invention is intended to reside in some form of computer readable medium, such as memory or disk or communicated via a network, and compiled and executed by a processor.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined by the appended claims.

We claim:

1. A file server which allows for increasing a number of entities that can be serviced comprising:

a plurality of server session sockets (SSSs), each of the plurality of SSSs comprising an addressable entity within the file server for enabling communications, a plurality of entity identification numbers being associated with each of the plurality of SSSs;

means for assigning a particular SSS of the plurality of SSSs and assigning an entity identification number of the plurality of entity identification numbers associated with the particular SSS of the plurality of SSSs to a request from one of the number of entities; and     means within the file server for matching the entity identification number and the particular SSS to a communication from the one of the number of entities.

2. The file server of claim 1 in which the entity identification number comprises a session identification.

3. The file server of claim 1 in which the request comprises an incoming open session request.

4. A method which allows for increasing the number of entities that can be serviced by a file server comprising:

(a) providing a plurality of server session sockets (SSSs) within the file server, each of the plurality of SSSs comprising an addressable entity within the file server for enabling communications, a plurality of entity identification numbers being associated with each of the plurality of SSSs;

(b) assigning a particular SSS to a request from one of the number of entities; and (c) assigning an entity identification number of the plurality of entity identification numbers associated with the particular SSS to the request from one of the number of entities.

5. The method of claim 4 in which the entity identification number comprises a session identification.

6. The method of claim 4 in which the request comprises an incoming open session request.

7. A method for increasing the number of entities that can be serviced by a file server, the method comprising the steps of:

(a) providing a plurality of server session sockets (SSSs) within the file server, wherein each one of the plurality of SSSs includes one SSS reference number and a plurality of session identifiers to assign to entities on a network; and (b) receiving a session open request from an entity;

(c) finding a first available session identifier of a particular one of the plurality of SSSs;

(d) assigning a reference number of the particular one of the plurality of SSSs to the entity; and (e) assigning the first available session identifier of the particular one of the plurality of SSSs to the entity.

8. The method of claim 7 wherein in a first type of communication from the entity to the server, the entity provides the session reference number and session identifier assigned to the entity, the method further comprising the step of:

(f) identifying which one of the plurality of SSSs the entity is assigned ot by referencing the session reference number and session identifier provided by the entity.

9. The method of claim 8 wherein in a second type of communication from the entity to the server, the entity provides the session reference number and an entity address, the method further comprising the step of:

(g) searching each one of the plurality of SSSs until the session reference number and entity address provided by the entity matches the session reference number and entity address stored in a particular one of the SSSs.

10. A computer-readable medium containing program instructions for increasing the number of entities that can be serviced by a file server, the program containing instructions for:

(a) providing a plurality of server session sockets (SSSs) within the file server, each of the plurality of SSSs comprising an addressable entity within the file server for enabling communications, a plurality of entity identification numbers being associated with each of the plurality of SSSs;

(b) assigning a particular SSS of the plurality of SSSs to a request from one of the number of entities; and (c) assigning an entity identification number of the plurality of entity identification numbers associated with the particular SSS to the request from one of the number of entities.

11. The computer-readable medium of claim 10 in which the entity identification number comprises a session identification.

12. The computer-readable medium of claim 11 in which the request comprises an incoming open session request.

13. The file server of claim 1 wherein the assigning means further assign a reference number of the particular SSS to the request from one of the number of entities.

14. The file server of claim 13 wherein the matching means further comprise:

means for matching the entity identification number and the particular SSS to a communication from the one of the number of entities when the communication does not include the reference number of the particular SSS.

15. The method of claim 4 wherein the assigning step (b) further includes the step of:

(b1) assigning a reference number of the particular SSS to the request from one of the number of entities.

16. The method of claim 15 further including the step of:

(d) matching the entity identification number and the particular SSS to a communication from the one of the number of entities when the communication does not include the reference number of the particular SSS.

17. The method of claim 7 further including the step of:

(f) matching the entity identification number and the particular SSS to a communication from the one of the number of entities when the communication does not include the reference number of the particular SSS.

18. The computer-readable medium of claim 10 wherein the assigning instruction (b) further includes instructions for:

(b1) assigning a reference number for the particular SSS to the request from one of the number of entities.

19. The computer-readable medium of claim 18 further wherein the program further includes instructions for:

(d) matching the entity identification number and the particular SSS to a communication from the one of the number of entities when the communication does not include the reference number of the particular SSS.

* * * * *